US009164892B2

(12) United States Patent
Oh

(10) Patent No.: US 9,164,892 B2
(45) Date of Patent: Oct. 20, 2015

(54) WRITING DATA TO SOLID STATE DRIVES

(75) Inventor: Hyun Oh Oh, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 165 days.

(21) Appl. No.: 13/977,262

(22) PCT Filed: Jul. 30, 2012

(86) PCT No.: PCT/US2012/048845

§ 371 (c)(1),
(2), (4) Date: Jun. 28, 2013

(87) PCT Pub. No.: WO2014/021821

PCT Pub. Date: Feb. 6, 2014

(65) Prior Publication Data

US 2014/0032822 A1 Jan. 30, 2014

(51) Int. Cl.

| | |
|---|---|
| ***G06F 3/06*** | (2006.01) |
| ***G06F 12/02*** | (2006.01) |
| *G06F 13/38* | (2006.01) |

(52) U.S. Cl.
CPC ............ *G06F 12/0246* (2013.01); *G06F 12/02* (2013.01); *G06F 2212/7202* (2013.01)

(58) Field of Classification Search
None
See application file for complete search history.

(56) References Cited

U.S. PATENT DOCUMENTS

| | | | | |
|---|---|---|---|---|
| 5,621,692 | A | 4/1997 | Lin | |
| 8,060,714 | B1 | 11/2011 | Natanzon | |
| 2003/0163633 | A1 | 8/2003 | Aasheim et al. | |
| 2007/0204128 | A1 | 8/2007 | Lee et al. | |
| 2008/0052444 | A1 | 2/2008 | Hwang et al. | |
| 2009/0052236 | A1 * | 2/2009 | Bae et al. | 365/163 |
| 2010/0185804 | A1 | 7/2010 | Omizo et al. | |
| 2010/0287427 | A1 | 11/2010 | Kim et al. | |
| 2011/0085657 | A1 | 4/2011 | Matthews | |
| 2011/0286279 | A1 | 11/2011 | Lei et al. | |
| 2011/0307721 | A1 * | 12/2011 | Ouchi et al. | 713/321 |

FOREIGN PATENT DOCUMENTS

| | | | |
|---|---|---|---|
| JP | 2003256289 | A | 9/2003 |
| JP | 2005157781 | A | 6/2005 |
| WO | 2009084797 | A1 | 7/2009 |
| WO | 2010067361 | A1 | 6/2010 |

OTHER PUBLICATIONS

United States Patent and Trademark Office, International search report and written opinion of the International searching authority, mailed Nov. 19, 2012.

* cited by examiner

*Primary Examiner* — Scott Sun

(57) ABSTRACT

Technologies and implementations for writing data to a solid state drive are generally disclosed.

25 Claims, 6 Drawing Sheets

400

At a Memory Control Module, Receiving Data to be Written to a Target Page of the Memory 410

Determining a Number of Erase Operations Performed on the Target Page of the Memory 420

Determining a Writing Direction as Either a Forward Direction or a Backward Direction, Based at Least in Part on the Determined Number of Erase Operations Performed on the Target Page 430

Determining a First Address Value of a First Memory Cell of the Target Page of the Memory, Based at Least in Part on a Number of Erase Operations Performed on the Target Page 440

Writing the Received Data to the Target Page of the Memory in the Determined Writing Direction, Starting From the First Memory Cell of the Target Page of the Memory 450

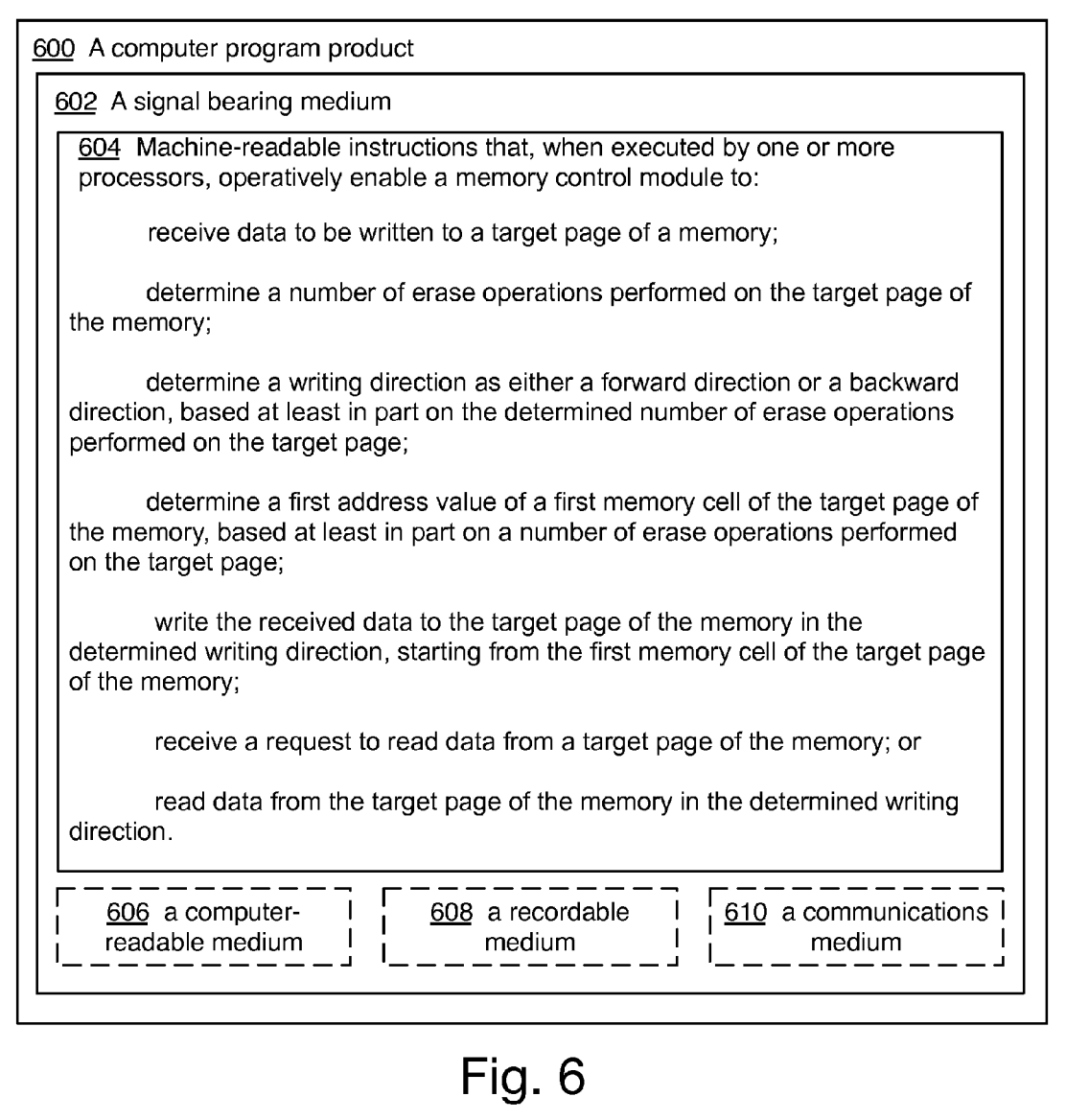

600 A computer program product

602 A signal bearing medium

604 Machine-readable instructions that, when executed by one or more processors, operatively enable a memory control module to:

receive data to be written to a target page of a memory;

determine a number of erase operations performed on the target page of the memory;

determine a writing direction as either a forward direction or a backward direction, based at least in part on the determined number of erase operations performed on the target page;

determine a first address value of a first memory cell of the target page of the memory, based at least in part on a number of erase operations performed on the target page;

write the received data to the target page of the memory in the determined writing direction, starting from the first memory cell of the target page of the memory;

receive a request to read data from a target page of the memory; or read data from the target page of the memory in the determined writing direction.

606 a computer-readable medium 608 a recordable medium 610 a communications medium

Fig. 6

WRITING DATA TO SOLID STATE DRIVES

CROSS-REFERENCE TO RELATED APPLICATION

This application is a U.S. national stage filing under 35 U.S.C. §371 of International Application No. PCT/US2012/048845, filed on Jul. 30, 2012.

BACKGROUND

Unless otherwise indicated herein, the approaches described in this section are not prior art to the claims in this application and are not admitted to be prior art by inclusion in this section.

Memory locations within a solid-state drive (SSD) may be grouped into sections of memory (e.g., 1 kB blocks, 4 kB blocks, or the like), referred to as "pages". When a file is written to a page or pages in an SSD, any memory within the page(s) that is not needed to store the file may be kept at an initial state (e.g., logic 1, or the like). As a result, after repeated write cycles, some portion of the pages may experience stress due to repeatedly storing the same logic value. This stress may result in wear bias or failure of the corresponding memory cell in the pages.

SUMMARY

Detailed herein are various illustrative methods for writing data into a memory. Example methods may include at a memory control module, receiving data to be written to a target page of the memory, determining a number of erase operations performed on the target page of the memory, determining a writing direction as either a forward direction or a backward direction, based at least in part on the determined number of erase operations performed on the target page, and writing the received data to the target page of the memory in the determined writing direction, starting from the first memory cell of the target page of the memory.

Another example method may include at a memory control module, receiving a request to read data from a target page of the memory, determining a writing direction as either a forward direction or a backward direction, wherein the writing direction is based at least in part on a number of erase operations performed on the target page, and reading data from the target page of the memory in the determined writing direction.

The present disclosure also describes various example machine readable non-transitory medium having stored therein instructions that, when executed by one or more processors, operatively enable a memory control module to write data to a memory. Example machine readable non-transitory media may have stored therein instructions that, when executed by one or more processors, operatively enable a memory control module to receive data to be written to a target page of a memory, determine a number of erase operations performed on the target page of the memory, determine a writing direction as either a forward direction or a backward direction, based at least in part on the determined number of erase operations performed on the target page, and write the received data to the target page of the memory in the determined writing direction, starting from the first memory cell of the target page of the memory.

The present disclosure additionally describes example systems. Example systems may include a processor, a memory control module communicatively coupled to the processor, and a machine readable medium communicatively coupled to the processor and the memory control module, the machine readable medium having stored therein instructions that, when executed by the processor, cause the memory control module to receive data to be written to a target page of a memory, determine a number of erase operations performed on the target page of the memory, determine a writing direction as either a forward direction or a backward direction, based at least in part on the determined number of erase operations performed on the target page, and write the received data to the target page of the memory in the determined writing direction, starting from the first memory cell of the target page of the memory.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings:

FIG. 6 is an illustration of an example computer program product; and

DETAILED DESCRIPTION

Figure 1:
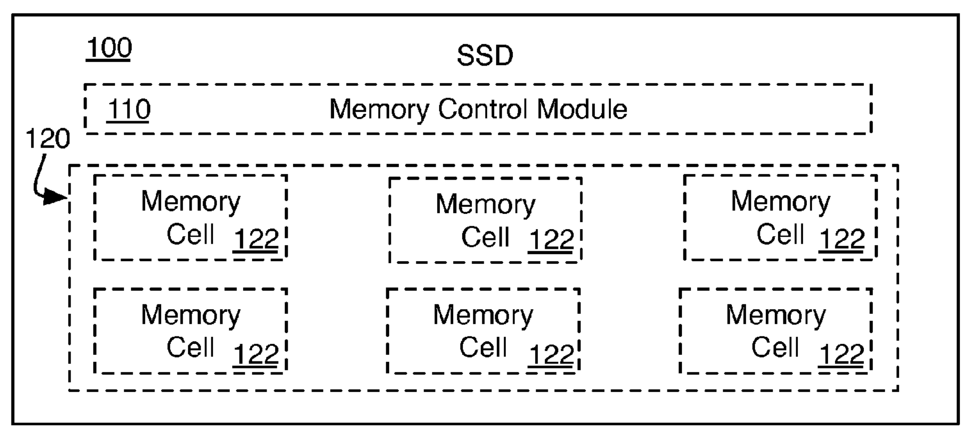
FIG. 1 is an illustration of a block diagram of example solid state storage device (SSD)

The following description sets forth various examples along with specific details to provide a thorough understanding of claimed subject matter. It will be understood by those skilled in the art that claimed subject matter might be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to writing data to a solid state storage device (SSD).

Electrical stress that causes bias or failures of memory cells in an SSD may be caused by repeatedly writing the same logic value to the memory cells. As will be appreciated, portions of pages in an SSD may repeatedly have the same logic value written to them. More specifically, portions of pages that are often not needed to store data may be repeatedly set to an "initial state" (e.g., logic 1, or the like). As a result, the memory cells corresponding to these portions may develop a wear bias after a number of write cycles.

Data corresponding to a digital file (e.g., a document, a digital picture, a digital video, an executable file, a binary file, or the like) may be written to an SSD using pages. For example, files having a size (e.g., in bytes, or the like) of less than a page may be written to a single page. As such, a portion of the page may be used to store data associated with the digital file while the rest of the page may be unused. The unused portion may be set to an initial state (e.g., logic 1, or the like) as part of writing the data to the page. Similarly, files having a size of greater than a page may be written to multiple pages. However, one of the multiple pages may have a portion that is not used to store data associated with the digital file and may therefore be set to an initial state as described above.

Accordingly, as can be appreciated, memory cells corresponding to portions of the pages within an SSD (e.g., the unused portions described above, or the like) may repeatedly have the same data (e.g., logic 1, or the like) written to them. In general, the unused memory cells may be located near the end of each page. Accordingly, the repeated writing of the same data to these memory cells may result in electrical stress that causes a wear bias or other type of failure.

Various embodiments described herein may be provided to reduce the amount of bias that may be induced by repeatedly writing the same data to some portions of a page. For example, in some embodiments described herein, the data may be written to a page in either a forward direction or a backward direction, in an alternating manner. More particularly, data may be written to a page starting from the first memory cell (e.g. the memory cell associated with the lowest value of memory address, or the like) in the page and progressing towards the last memory cell (e.g. the memory cell associated with the highest value of memory address, or the like) in the page during some write cycles (e.g., even erasure count, or the like). Additionally, data may be written to a page starting from the last memory cell in the page and progressing towards the first memory cell in the page during other write cycles (e.g., odd erasure count, or the like). Accordingly, the portion of each page that may remain unused after data is written to the pages may alternate between being located near the front of the page and the back of the page. As such, wear induced bias may be reduced.

This example, as well as other examples given herein, are not intended to be limiting. Instead it was provided as a brief overview of example embodiments described herein. Furthermore, although various embodiments are described with reference to an SSD, some embodiments may be applied to other types of memory storage devices that organize memory cells into sections (e.g., pages, or the like). Additionally, at least some embodiments described herein may be implemented in an SSD in a standalone fashion (e.g., by a memory controller, software embedded in the SSD, or the like). Alternatively, some embodiments may be implemented in an operating system (e.g., in a flash transition layer, in a hardware abstraction layer, in a device driver, or the like). Additionally, although reference herein is made to a solid state storage device (SSD), the term "SSD" may be used interchangeable with a solid state drive, solid state disk drive, or the like.

Furthermore, although reference is made herein to various writing directions (e.g., forwards, backwards, or the like), these are not intended to be limiting. For example, some embodiments may write data to a page in an SSD starting from an intermediate location within the page and then progressing in either a forwards or a backwards direction as described herein.

FIG. 1 illustrates a block diagram of an example SSD 100, arranged in accordance with at least some embodiments of the present disclosure. As can be seen from this figure, the SSD 100 may include a memory control module 110 and a memory array 120. The memory array 120 may include a number of memory cells 122. In general, the memory cells 122 may be comprised of any type of integrated circuit assembly that is configured to persistently store data. For example, the memory cells 122 may be comprised of NAND flash memory components. Alternatively, the memory cells 122 may be comprised of NOR flash memory components.

In general, the memory control module 110 may include logic and/or features configured to facilitate writing data to and reading data from the memory cells within the memory array 120. More specifically, the memory control module 110 may provide access to the memory array 120. For example, the memory control module 110 may be used to allow a host computer system to access (e.g., write data to and read data from) the memory array 120. The memory control module 110 may also include logic and/or features configured to perform additional functions (e.g., error correction, wear leveling, bad block detection, read scrubbing, encryption, garbage collection, formatting, or the like) for managing the memory array 120.

As indicated above, memory cells within an SSD may be organized into "pages". For example, the memory control module 110 may organize the memory cells 122 into pages such that when a device (e.g., a cell phone, a laptop computer, a tablet computer, or the like) connects to the SSD 100, the pages are made available to store data. As another example, an operating system (e.g., using a flash translation layer, using a hardware abstraction layer, and/or using the memory control module 110, or the like) may organize the memory cells 122 into pages as part of a virtual memory process.

Figure 2:
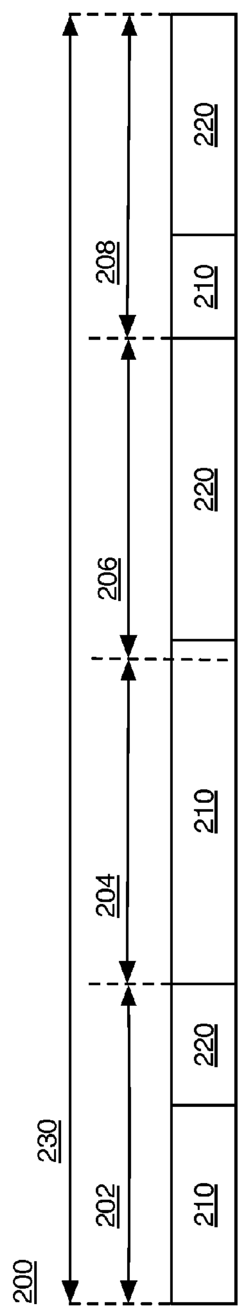
FIG. 2 is an illustration of a block diagram of example pages in an SSD.

FIG. 2 illustrates a block diagram of example pages in an SSD, arranged in accordance with at least some embodiments of the present disclosure. As can be seen from this figure, a set of pages 200, including the pages 202, 204, 206 and 208, may be shown. Furthermore, the pages 200 may be shown having data 210 written to them. As can be seen, in some pages 200 (e.g., the page 204) the data 210 may fill the entire page. However, in other pages 200 (e.g., the pages 202, 206 and 208) the data 210 may not fill the entire page. As such, unused portions 220 of the pages 200 may be shown.

The pages in an SSD (e.g., the pages 200) may be organized into erasure blocks. For example, FIG. 2 shows an erasure block 230 that may include the pages 202, 204, 206 and 208. In general, writing data to a page 200 at the erasure block level may include first erasing (e.g., setting the logical value to 1) the memory cells 122 in the erasure block 230. Then the logical values of the memory cells 122 in one or more pages 200 in the erasure block 230 may be set to correspond to the data 210. As will be appreciated, the memory cells 122 in the unused portions 220 may not be changed from the erased value.

This process (e.g., erase memory cells, set memory cells to a proper value) may be referred to as "block erasure". Furthermore, each time a block erase process is performed may be referred to as an "erasure cycle". The number of erasure cycles applied to a particular erasure block (e.g., the erasure block 230) may be tracked (e.g., stored by the memory control module 110, stored in the LBA of the SSD 100, stored in a header of the erasure block 230, or the like).

Accordingly, as described, writing data to an SSD using a block erasure process may cause the same logical value (e.g., logic 1) to be repeatedly written to the memory cells corresponding to the unused portions 220. As such, over time (e.g., after a number of erasure cycles, or the like) a wear bias may develop in the unused portions 220 of each page 200. As will be further appreciated, the location of the unused portions 220 of each page 200 may change from erasure cycle to erasure cycle. However, in a conventional SSD, the unused portions 220 may often be located near the end of each page 200. Accordingly, over time, the memory cells 122 corresponding to the locations near the end of each page 200 (e.g., memory cells having higher address values, or the like) may develop a wear bias as described above.

Figure 3:
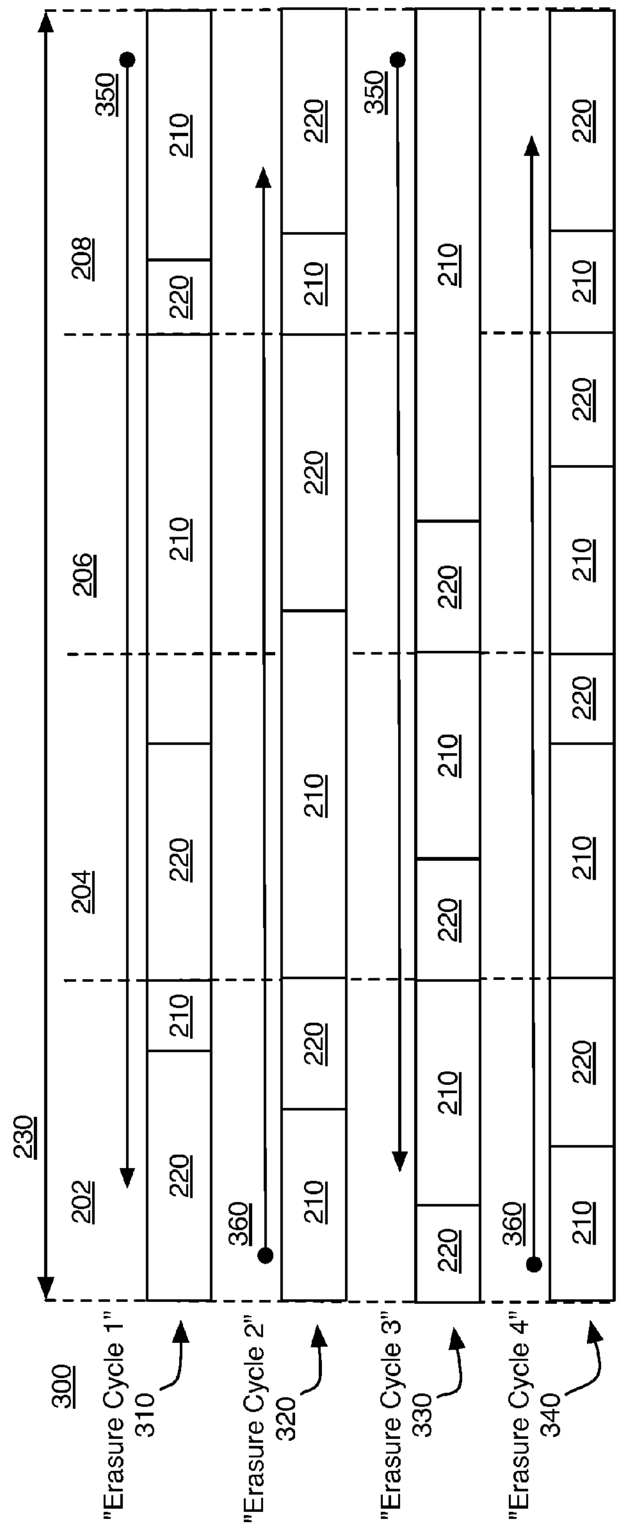
FIG. 3 is an illustration of a block diagram of example pages in an SSD during multiple write cycles.

FIG. 3 illustrates a block diagram of example pages in an SSD during multiple write cycles, arranged in accordance with at least some embodiments of the present disclosure. As indicated, in some embodiments disclosed herein, the direction of writing data to a page may alternate between a forward and a backward direction (e.g., depending upon the erasure cycle count, or the like). For example, FIG. 3 illustrates the erasure block 230 over a number of erasure cycles 300. As can be seen from this figure, for the erasure cycles 310 and 330, data 210 may be written to the erasure block 230 in a backward direction 350 (e.g., starting from the last memory cell 122 in each page 200). With the erasure cycles 320 and 340, data 210 may be written to the erasure block 230 in a forward direction 360 (e.g., starting from the first memory cell 122 in each page 200).

Accordingly, as can be seen from FIG. 3, the location of the unused portions may alternate between being located near the front of the pages 200 (e.g., in the case of the backwards direction of writing 350) and the back of the pages 200 (e.g., in the case of the forwards direction of writing 360).

As will be appreciated, although the data 210 and the unused portions 220 shown in FIG. 2 and FIG. 3 may use the same identifier, it is not intended that they necessarily be the same. More particularly, the data 210 shown in page 202 of erasure cycle 302 may be different than the data 210 shown elsewhere in FIGS. 1 and 2 (e.g., in another page 200, in the same page 200 but in another erasure cycle 300, or the like). For example, although the data 210 in a particular page 200 may correspond to the same digital file from erasure cycle 300 to erasure cycle 300, the digital file may have changed (e.g., updates to a text file, changes made to photograph, or the like). Furthermore, data corresponding to a different digital file may be written to a page 200 from erasure cycle 300 to erasure cycle 300. Accordingly, although the same identifiers are used for the data 210 and the unused portions 220, this is done for clarity of presentation only and is not intended to be limiting.

Additionally, although the pages 200 are shown within a single erasure block (e.g., the erasure block 230), in some embodiments, an erasure block may include more or less pages than that shown in FIGS. 2 and 3. Furthermore, as will be appreciated, an SSD may include many more pages 200 than are shown in FIGS. 2 and 3. However, only a few pages 200 are shown for purposes of clarity. Accordingly, it will be appreciated that the various embodiments described herein may be applied to SSDs with more pages than that shown in FIGS. 2 and 3.

Figure 4:
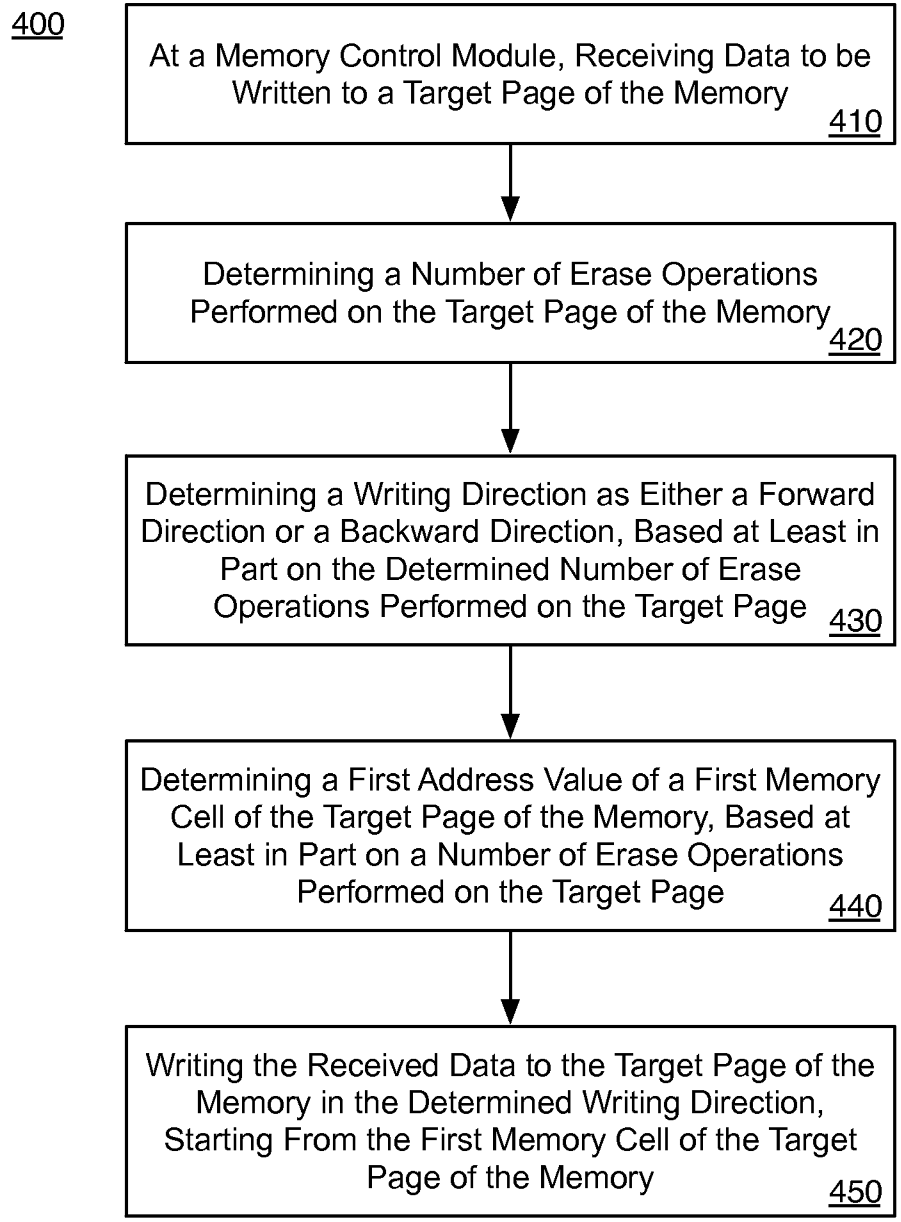
FIG. 4 is an illustration of a flow diagram of an example method for writing data to an SSD.
Figure 5:
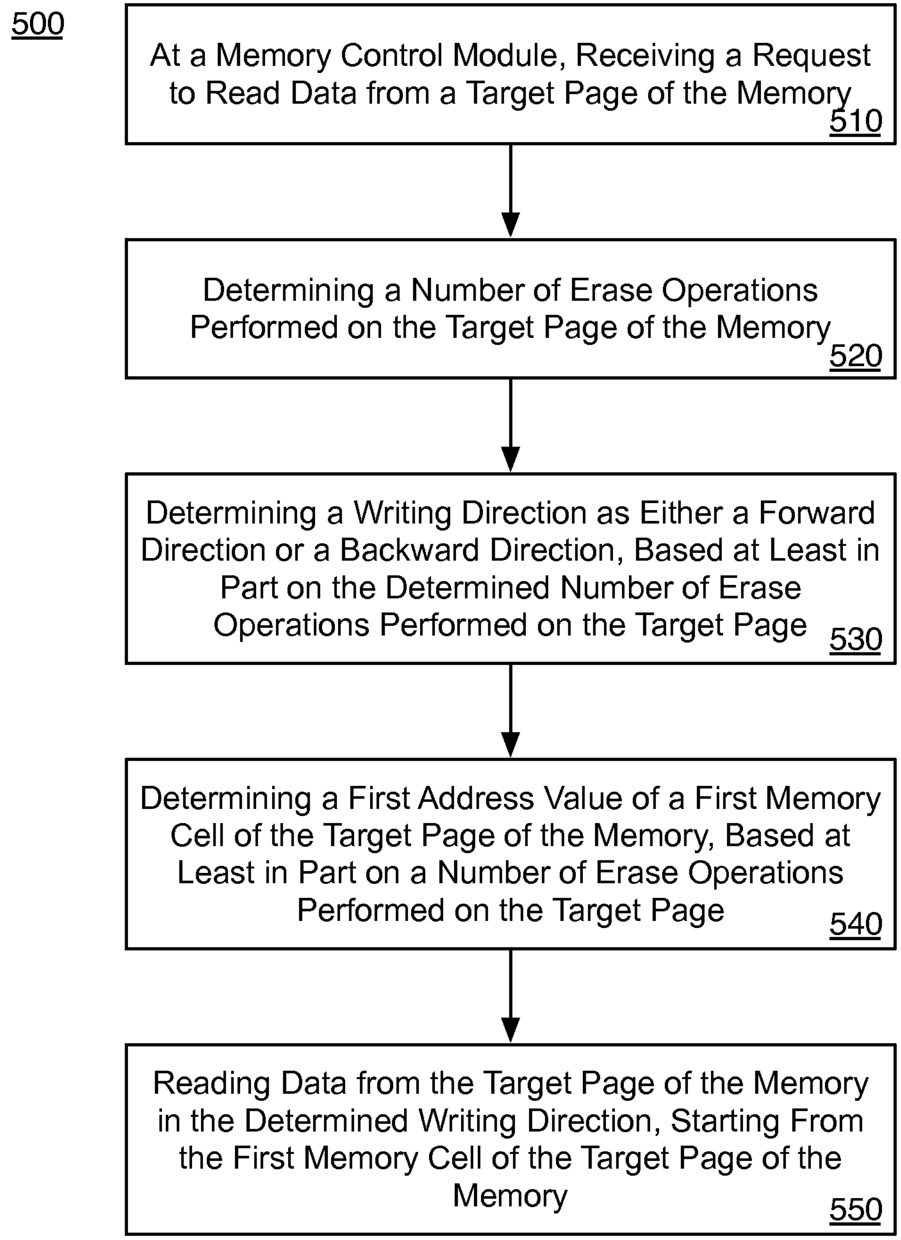
FIG. 5 is an illustration of a flow diagram of an example method for reading data from an SSD.

FIG. 4 illustrates a flow chart of an example method for writing data to an SSD, arranged in accordance with at least some embodiments of the present disclosure. Additionally, FIG. 5 illustrates a flow chart of an example method for reading data from an SSD, arranged in accordance with at least some embodiments of the present disclosure. In some portions of the description, illustrative implementations of the methods depicted in FIGS. 4 and 5 may be described with reference to the elements of the SSD 100, the pages 200 and the erasure cycles 300 depicted in FIGS. 1, 2 and 3. However, the described embodiments are not limited to this depiction. More specifically, some elements depicted in FIGS. 1, 2 and 3 may be omitted from some implementations of the methods detailed herein. Furthermore, other elements not depicted in FIGS. 1, 2 and 3 may be used to implement example methods detailed herein.

Additionally, FIGS. 4 and 5 employs block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of claimed subject matter.

FIG. 4 illustrates an example method 400 for writing data to an SSD, arranged in accordance with various embodiments of the present disclosure. Method 400 may begin at block 410 ("At a Memory Control Module, Receiving Data to be Written to a Target Page of the Memory"). The memory control module 110 may include logic and/or features configured to receive data to be written to a target page of a memory. In general, at block 410, the memory control module 110 may receive data 210 to be written to one of the pages 200, referred to as "the target page".

Processing may continue from block 410 to block 420 ("Determining a Number of Erase Operations Performed on the Target Page of the Memory"). The memory control module 110 may include logic and/or features to determine a number of erase operations performed on the target page. In general, at block 420, the memory control module may determine the erasure cycle 300 from the SSD 100. For example, the SSD 100 may maintain an erasure count for purposes of other SSD operations (e.g., wear leveling, or the like). In some examples, the erasure cycle value may be stored as a variable in each erasure block, stored in memory in the memory control module 110, stored in the SSD LBA, or the like. Accordingly, at block 420, the memory control module 110 may determine the number of erase operations performed from this value. In some embodiments, an erasure count may be maintained for purposes of determining a direction of writing (e.g., forward, backward, or the like).

Processing may continue from block 420 to block 430 ("Determining a Writing Direction as Either a Forward Direction or a Backward Direction, Based at Least in Part on the Determined Number of Erase Operations Performed on the Target Page"). The memory control module 110 may include logic and/or features configured to determine a direction of writing. For example, as shown in FIG. 3, the direction of writing may correspond to whether the erasure count is even or odd. More specifically, with some embodiments, the direction of writing may be determined as either forwards or backwards depending upon whether the erasure count is even or odd.

In some embodiments, the direction of writing may be determined based on a modulo operation. More specifically, the modulo (e.g., remainder) of the erasure count divided by a particular number (e.g., 4, 8, or the like) may be used to determine the direction of writing. For example, for even modulos the direction of writing may be backwards while for odd modulos the direction of writing may be forwards.

Processing may continue from block 430 to block 440 ("Determining a First Address Value of a First Memory Cell of the Target Page of the Memory, Based at Least in Part on a Number of Erase Operations Performed on the Target Page"). The memory control module 110 may include logic and/or features configured to determine an address value of a memory cell in the target page. In general, at block 440, the memory control module 110 may determine the address of a particular memory cell in the page 200, referred to herein as "the first memory cell".

It will be appreciated, that the first memory cell may not necessarily be the memory cell corresponding to the first location in the target page. For example, for an even erasure count, the memory control module 110 may determine the address of the first memory cell in the page as the memory cell corresponding to the first location in the target page. This may result in the memory cell having the lowest memory address in the page being determined as the first memory cell. As another example, for an odd erasure count, the memory control module 110 may determine the first memory cell in the page as the memory cell corresponding to the last location in the page. This may result in the memory cell having the highest memory address in the page being determined as the first memory cell.

In some embodiments, at block 440, the memory control module 110 may determine an address for the first memory cell based on a modulo operation. For example, using modulo 5 and assuming each page comprises 1024 memory cell, the memory control module 110 may determine the address of the first memory cell as follows: the address may correspond to the memory cell of the first location in the page for modulo 0, the $256^{th}$ location for modulo 1, the $512^{th}$ location for modulo 2, the $768^{th}$ location for modulo 3 and the last location (e.g., $1024^{th}$ byte) for modulo 4.

In some examples, the direction of writing may be constant. For example, as indicated above, the address for the first memory cell may alternate between a variety of intermediate locations. Accordingly, the memory control module 110 may determine a particular direction of writing (e.g., forwards, backwards, or the like) at block 430. Then, at block 440, the memory control module 110 may determine an address for the first memory cell based on a modulo operation as detailed above. As such, although the direction of writing may not change, the location of unused portions of each page may still change.

Processing may continue from block 440 to block 450 ("Writing the Received Data to the Target Page of the Memory in the Determined Writing Direction, Starting From the First Memory Cell of the Target Page of the Memory"). The memory control module 110 may include logic and/or features configured to write the received data in the determined writing direction starting from the determined memory address of the first memory cell. In general, at block 450, the memory control module 110 may write the received data to the page starting from the determined address, that is, the first memory cell, and continuing in the direction of writing. For example, for a forwards direction of writing, the memory control module 110 may increment the memory address as data is being written, while for a backwards direction of writing, the memory address may be decremented as data is being written.

FIG. 5 illustrates an example method 500 for reading data from an SSD, arranged in accordance with various embodiments of the present disclosure. Method 500 may begin at block 510 ("At a Memory Control Module, Receiving a Request to Read Data from a Target Page of the Memory"). The memory control module 110 may include logic and/or features configured to receive a request to read data from a target page of a memory. In general, at block 510, the memory control module 110 may receive a request to read data 210 from one of the pages 200, referred to as "the target page".

Processing may continue from block 510 to block 520 ("Determining a Number of Erase Operations Performed on the Target Page of the Memory"). The memory control module 110 may include logic and/or features to determine a number of erase operations performed on the target page. In general, at block 520, the memory control module may determine the erasure cycle 300 from the SSD 100.

Processing may continue from block 520 to block 530 ("Determining a Writing Direction as Either a Forward Direction or a Backward Direction, Based at Least in Part on the Determined Number of Erase Operations Performed on the Target Page"). The memory control module 110 may include logic and/or features configured to determine a direction of writing. For example, as shown in FIG. 3, the direction of writing may correspond to whether the erasure count is even or odd.

Processing may continue from block 530 to block 540 ("Determining a First Address Value of a First Memory Cell of the Target Page of the Memory, Based at Least in Part on a Number of Erase Operations Performed on the Target Page"). The memory control module 110 may include logic and/or features configured to determine an address value of a memory cell in the target page. In general, at block 540, the memory control module 110 may determine the address of a particular memory cell in the page 200, referred to herein as "the first memory cell".

Processing may continue from block 540 to block 550 ("Reading Data from the Target Page of the Memory in the Determined Writing Direction, Starting From the First Memory Cell of the Target Page of the Memory"). The memory control module 110 may include logic and/or features configured to read data from the page in the determined writing direction starting from the determined memory address of the first memory cell. In general, at block 550, the memory control module 110 may read data from the page starting from the determined address, that is, the first memory cell, and continuing in the direction of writing. For example, for a forwards direction of writing, the memory control module 110 may increment the memory address as data is being read, while for a backwards direction of writing, the memory address may be decremented as data is being read.

In general, the methods described with respect to FIGS. 4 and 5 and elsewhere herein may be implemented as a computer program product, executable on any suitable computing system, or the like. For example, a computer program product for writing data to an SSD may be provided. Example computer program products may be described with respect to FIG. 6 and elsewhere herein.

FIG. 6 illustrates an example computer program product 600, arranged in accordance with at least some embodiments of the present disclosure. Computer program product 600 may include machine readable non-transitory medium having stored therein instructions that, when executed, cause a memory control module to write data to an SSD according to the processes and methods discussed herein. Computer program product 600 may include a signal bearing medium 602. Signal bearing medium 602 may include one or more machine-readable instructions 604, which, when executed by one or more processors, may operatively enable a computing device to provide the functionality described herein. In various examples, some or all of the machine-readable instructions may be used by the devices discussed herein.

In some examples, the machine readable instructions 604 may include receiving data to be written to a target page of a memory. In some examples, the machine readable instructions 604 may include determining a number of erase operations performed on the target page of the memory. In some examples, the machine readable instructions 604 may include determining a writing direction as either a forward direction or a backward direction, based at least in part on the determined number of erase operations performed on the target page. In some examples, the machine readable instructions 604 may include determining a first address value of a first memory cell of the target page of the memory, based at least in part on a number of erase operations performed on the target page. In some examples, the machine readable instructions 604 may include writing the received data to the target page of the memory in the determined writing direction, starting from the first memory cell of the target page of the memory. In some examples, the machine readable instructions 604 may include receiving a request to read data from a target page of the memory. In some examples, the machine readable instructions 604 may include reading data from the target page of the memory in the determined writing direction.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communication link, a wireless communication link, etc.). In some examples, the signal bearing medium 602 may encompass a machine readable non-transitory medium.

In general, the methods described with respect to FIGS. 4, 5 and elsewhere herein may be implemented in any suitable server and/or computing system. Example systems may be described with respect to FIGS. 4, 5 and elsewhere herein. In some examples, a resource, data center, data cluster, cloud computing environment, or other system as discussed herein may be implemented over multiple physical sites or locations. In general, the system may be configured to write data to an SSD and read data from the SSD.

Figure 7:
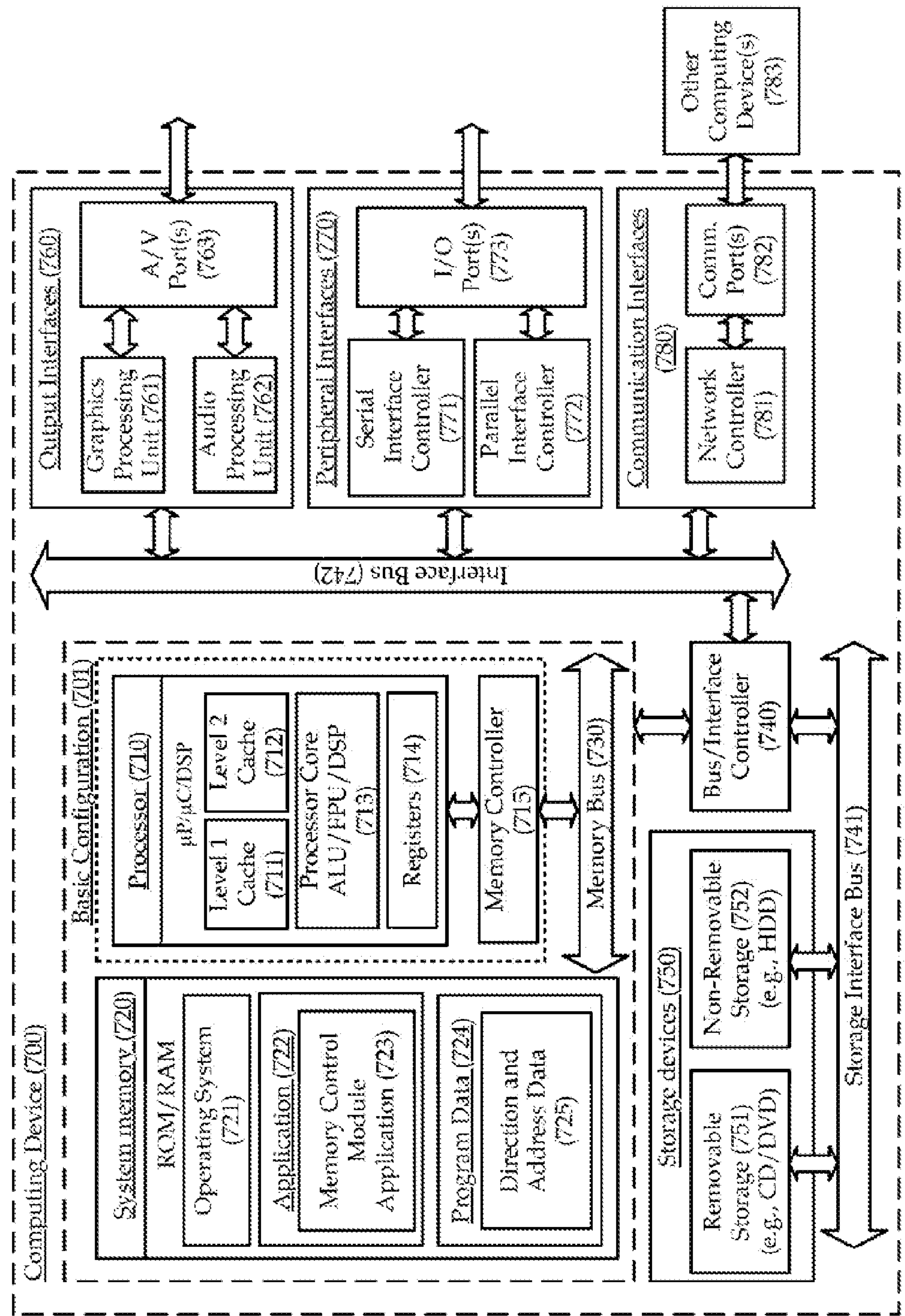
FIG. 7 is an illustration of a block diagram of an example computing device, all arranged in accordance with at least some embodiments of the present disclosure.

FIG. 7 is a block diagram illustrating an example computing device 700, arranged in accordance with at least some embodiments of the present disclosure. In various examples, computing device 700 may be configured to write data to an SSD as discussed herein. In various examples, computing device 700 may be configured to write data to an SSD as a memory control module, as a flash translation layer, or as a portion of an operating system as discussed herein. In one example of a basic configuration 701, computing device 700 may include one or more processors 710 and a system memory 720. A memory bus 730 can be used for communicating between the one or more processors 710 and the system memory 720.

Depending on the desired configuration, the one or more processors 710 may be of any type including but not limited to a microprocessor (μP), a microcontroller (μC), a digital signal processor (DSP), or any combination thereof. The one or more processors 710 may include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the one or more processors 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. The system memory 720 may include an operating system 721, one or more applications 722, and program data 724. The one or more applications 722 may include memory control module application 723 that can be arranged to perform the functions, actions, and/or operations as described herein including the functional blocks, actions, and/or operations described herein. The program data 724 may include direction and address data 725 for use with memory control module application 723. In some example embodiments, the one or more applications 722 may be arranged to operate with the program data 724 on the operating system 721. This described basic configuration 701 is illustrated in FIG. 7 by those components within dashed line.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The one or more data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 720, the removable storage 751 and the non-removable storage 752 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more NV ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 783 over a network communication via one or more communication ports 782. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 700 may also be implemented as a personal computer including both laptop computer and non-laptop computer configurations. In addition, the computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to write data into a memory, comprising:

at a memory control module, receiving data to be written to a target page of the memory, wherein the target page comprises a plurality of memory cells including a first memory cell and a last memory cell;

determining a number of erase operations performed on the target page of the memory;

determining a writing direction as either a forward direction or a backward direction, based at least in part on the determined number of erase operations performed on the target page, wherein the forward direction writes data from the first memory cell of the page toward the last memory cell of the page and the backward direction writes data from the last memory cell of the page toward the first memory cell; and writing the received data to the target page of the memory in the determined writing direction.

2. The method of claim 1, wherein writing the received data to the target page of the memory in the determined writing direction comprises:

determining a first address value of a first memory cell of the target page of the memory; and writing the received data starting from the determined first address value.

3. The method of claim 1, wherein writing the received data comprises writing the received data in the forward direction when the determined number of erase operations corresponds to an even number.

4. The method of claim 1, wherein writing the received data comprises writing the received data in the backward direction when the determined number of erase operations corresponds to an odd number.

5. The method of claim 2, wherein determining the first address value of the first memory cell of the target page of the memory comprises:

determining the first address value as a lowest address value corresponding to the target page when the determined number of erase operations corresponds to an even number; and determining the first address value as a highest address value corresponding to the target page when the determined number of erase operations corresponds to an odd number.

6. The method of claim 2, wherein determining the first address value of the first memory cell of the target page of the memory comprises:

determining a starting memory cell within the target page based in part upon the number of erase operations performed on the page and a modulo operation; and determining the first address value of the first memory cell of the target page as an address value corresponding to the determined starting memory cell.

7. The method of claim 2, wherein writing the received data in the backward direction comprises:

writing a first portion of the received data to the first memory cell of the target page associated with the first address value;

determining a second address value of a second memory cell of the target page to write a second portion of the received data, by decrementing the first address value;

writing a second portion of the received data to the second memory cell associated with the second address value; and writing each remaining portion of the received data to subsequent memory cells of the target page, wherein the address of each subsequent memory cell is determined by decrementing an address value of a previous memory cell.

8. The method of claim 1, wherein receiving data to be written to the target page of the memory comprises receiving data to be written to a target page of a solid state drive (SSD) storage device.

9. The method of claim 1, wherein receiving data to be written to the target page of the memory comprises receiving data to be written to the target page of the memory at a memory control module having a flash translation layer (FTL).

10. The method of claim 1, wherein determining the number of erase operations performed on the target page of the memory comprises determining the number of erase operations performed on the target page of the memory as an erasure count associated with a logical block, wherein the target page of the memory is part of the logical block.

11. A method to read data from a memory, comprising:

at a memory control module, receiving a request to read data from a target page of the memory, wherein the target page comprises a plurality of memory cells including a first memory cell and a last memory cell;

determining a writing direction as either a forward direction or a backward direction, wherein the writing direction is based at least in part on a number of erase operations performed on the target page, wherein the forward direction writes data from the first memory cell of the page toward the last memory cell of the page and the backward direction writes data from the last memory cell of the page toward the first memory cell; and reading data from the target page of the memory in the determined writing direction.

12. The method of claim 11, wherein determining the writing direction as either a forward direction or a backward direction comprises:

determining a number of erase operations performed on the target page of the memory;

determining the writing direction as forward when the number of erase operations are even; and determining the writing direction as backward when the number of erase operations are odd.

13. The method of claim 11, wherein reading data from the target page of the memory in the determined writing direction comprises:

determining a first address value of a first memory cell of the target page of the memory; and reading data starting from the determined first address value.

14. The method of claim 13, wherein determining the first address value of the first memory cell of the target page of the memory comprises:

determining the first address value as a lowest address value corresponding to the target page when the determined number of erase operations corresponds to an even number; and determining the first address value as a highest address value corresponding to the target page when the determined number of erase operations corresponds to an odd number.

15. The method of claim 13, wherein determining the first address value of the first memory cell of the target page of the memory comprises:

determining a starting memory cell within the target page based in part upon the number of erase operations performed on the page and a modulo operation; and determining the first address value of the first memory cell of the target page as an address value corresponding to the determined starting memory cell.

16. The method of claim 13, wherein reading data from the target page of the memory in the determined writing direction comprises:

reading a first portion of the data to the first memory cell of the target page associated with the first address value;

determining a second address value of a second memory cell of the target page to read a second portion of the data, by decrementing the first address value;

reading a second portion of the data to the second memory cell associated with the second address value; and reading each remaining portion of the data to subsequent memory cells of the target page, wherein the address of each subsequent memory cell is determined by decrementing an address value of a previous memory cell.

17. A machine-readable non-transitory medium having stored therein instructions that, in response to execution by one or more processors, operatively enable a memory control module to:

determine a number of erase operations performed on a target page of the memory, wherein the target page comprises a plurality of memory cells including a first memory cell and a last memory cell;

determine a writing direction as either a forward direction or a backward direction, based at least in part on the determined number of erase operations performed on the target page; and write data to the target page of the memory in the determined writing direction, starting from a first memory cell of the target page of the memory.

18. The machine-readable non-transitory medium of claim 17, wherein the stored instructions, in response to execution by one or more processors, operatively enable the memory control module to:

determine a first address value of a first memory cell of the target page of the memory; and write the data starting from the determined first address value.

19. The machine-readable non-transitory medium of claim 17, wherein the stored instructions, in response to execution by one or more processors, operatively enable the memory control module to write the data in the forward direction when the determined number of erase operations corresponds to an even number.

20. The machine-readable non-transitory medium of claim 17, wherein the stored instructions, in response to execution by one or more processors, operatively enable the memory control module to write the data in the backward direction when the determined number of erase operations corresponds to an odd number.

21. The machine-readable non-transitory medium of claim 18, wherein the stored instructions, in response to execution by one or more processors, operatively enable the memory control module to:

determine the first address value as a lowest address value corresponding to the target page when the determined number of erase operations corresponds to an even number; and determine the first address value as a highest address value corresponding to the target page when the determined number of erase operations corresponds to an odd number.

22. A computing system, comprising:

a memory;

a memory control module to the memory and configured to determine a number of erase operations performed on a target page of the memory, wherein the target page comprises a plurality of memory cells including a first memory cell and a last memory cell, and to determine a starting address value of the first memory cell of the target page and a writing direction as either a forward direction or a backward direction, based at least in part upon the determined number of erase operations performed on the target page, wherein the forward direction writes data from the first memory cell of the page toward the last memory cell of the page and the backward direction writes data from the last memory cell of the page toward the first memory cell; and write circuitry, coupled to the memory and to the memory control module, to write data to the target page starting from the starting address value determined by the memory control module and in the writing direction.

23. The computing system of claim 22, wherein to determine the starting address value, the memory control module is configured to determine a remainder resulting from a division of the determined number of erase operations by a particular number, and to obtain the starting address value at least in part from a division of a size of the target page by the determined remainder.

24. The computing system of claim 22, wherein the memory control module is configured to read data starting from the determined starting address value.

25. The computing system of claim 22, wherein to determine the writing direction as either the forward direction or the backward direction, the memory control module is configured to determine the writing direction as forward when the number of erase operations are even and determine the writing direction as backward when the number of erase operations are odd.

* * * * *

UNITED STATES PATENT AND TRADEMARK OFFICE

CERTIFICATE OF CORRECTION

PATENT NO. : 9,164,892 B2
APPLICATION NO. : 13/977262
DATED : October 20, 2015
INVENTOR(S) : Oh It is certified that error appears in the above-identified patent and that said Letters Patent is hereby corrected as shown below:

IN THE SPECIFICATION

In Column 1, Line 7, delete "§371" and insert -- § 371 --, therefor.

In Column 11, Line 12, delete "NV ports" and insert -- A/V ports --, therefor.

Signed and Sealed this
Eighth Day of March, 2016

Michelle K. Lee
*Director of the United States Patent and Trademark Office*